(12) United States Patent
Mingas

(10) Patent No.: US 11,578,765 B2
(45) Date of Patent: Feb. 14, 2023

(54) TORQUE LIMITER FOR A DRIVE TRAIN

(71) Applicant: Schaeffler Technologies AG & Co. KG, Herzogenaurach (DE)

(72) Inventor: Constantin Mingas, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 351 days.

(21) Appl. No.: 16/644,061

(22) PCT Filed: Sep. 12, 2018

(86) PCT No.: PCT/DE2018/100768
§ 371 (c)(1),
(2) Date: Mar. 3, 2020

(87) PCT Pub. No.: WO2019/052602
PCT Pub. Date: Mar. 21, 2019

(65) Prior Publication Data
US 2021/0062869 A1    Mar. 4, 2021

(30) Foreign Application Priority Data
Sep. 15, 2017   (DE) .......................... 102017121431.3

(51) Int. Cl.
*F16D 7/02*     (2006.01)
*F16F 15/129*   (2006.01)

(52) U.S. Cl.
CPC ............. *F16D 7/025* (2013.01); *F16D 7/021* (2013.01); *F16D 2300/22* (2013.01); *F16F 15/1297* (2013.01)

(58) Field of Classification Search
CPC ... F16D 7/025; F16D 2300/22; F16F 15/1297
USPC ........................................ 464/46; 192/107 M
See application file for complete search history.

(56) References Cited

U.S. PATENT DOCUMENTS

| | | |
|---|---|---|
| 6,001,750 A | 12/1999 | Lam |
| 6,119,839 A | 9/2000 | Jackel et al. |
| 6,182,804 B1 | 2/2001 | Lam |
| 6,194,059 B1 | 2/2001 | Yesnik |
| 8,178,182 B2 | 5/2012 | Spandem |
| 8,398,491 B2 * | 3/2013 | Saeki .................... F16F 15/129 464/46 |

(Continued)

FOREIGN PATENT DOCUMENTS

| | | |
|---|---|---|
| CN | 102171485 A | 8/2011 |
| CN | 102454720 A | 5/2012 |

(Continued)

*Primary Examiner* — Greg Binda

(57) ABSTRACT

A torque limiter for a drive train includes a rotational axis extending in an axial direction, a drive side, an output side, a first friction surface on a one of the drive side or the output side, a second friction surface on the other of the drive side or the output side, and a friction lining. The friction lining has a first material with a first friction coefficient facing the first friction surface and a second material with a second friction coefficient, different from the first friction coefficient, facing the second friction surface. The friction lining is under a preload acting in the axial direction, torque-transmissively connects the output side to the drive side until a limit torque is reached, and is arranged to slip on the first friction surface when the limit torque is exceeded.

6 Claims, 2 Drawing Sheets

(56) References Cited

U.S. PATENT DOCUMENTS

| | | |
|---|---|---|
| 2011/0177906 A1 | 7/2011 | Misu et al. |
| 2014/0094321 A1 | 4/2014 | Miyagawa et al. |
| 2017/0030425 A1 | 2/2017 | Ruhrup et al. |

FOREIGN PATENT DOCUMENTS

| | | |
|---|---|---|
| CN | 103392075 B | 11/2013 |
| CN | 103597230 A | 2/2014 |
| DE | 19728422 A1 | 1/1998 |
| DE | 60011495 T2 | 11/2004 |
| DE | 102007000648 A1 | 5/2008 |
| DE | 102015216085 A1 | 3/2017 |
| DE | 102017111751 A1 | 12/2018 |
| DE | 102019015725 A1 | 9/2020 |
| EP | 1176339 B1 | 11/2006 |
| EP | 2226528 A2 | 9/2010 |
| JP | H1073147 A | 3/1998 |
| JP | 2010216523 A | 9/2010 |
| WO | 2012168997 A1 | 12/2012 |
| WO | 2018177471 A1 | 10/2018 |

\* cited by examiner

TORQUE LIMITER FOR A DRIVE TRAIN

CROSS-REFERENCE TO RELATED APPLICATIONS

This application is the United States National Phase of PCT Appln. No. PCT/DE2018/100768 filed Sep. 12, 2018, which claims priority to German Application No. DE102017121431.3 filed Sep. 15, 2017, the entire disclosures of which are incorporated by reference herein.

TECHNICAL FIELD

The disclosure concerns a torque limiter for a drive train, in particular for a drive train of a motor vehicle. The drive train is in particular a drive train for a hybrid vehicle. The drive train in particular comprises a first drive unit (e.g. an internal combustion engine) and a second drive unit (e.g. an electric machine) which can be connected together torque-transmissively and separated from each other via the torque limiter.

BACKGROUND

In known torque limiters, the friction linings are fixed to one of the drive side and output side via form-fit connections in the circumferential direction between the friction surface and the friction lining (e.g. by riveting or by intermeshing profiling). Alternatively, the friction lining is connected to the friction surface via substance bonding with an adhesive.

This form-fit or substance-bonded fixing of the friction lining to one of the friction surfaces, however, requires increased assembly or production complexity and leads to higher costs.

SUMMARY

The disclosure concerns a torque limiter for a drive train, including a rotational axis extending in an axial direction, and a drive side and an output side. The drive side and the output side are connected together torque-transmissively (during operation of the torque limiter) via at least one friction lining and under a preload acting in the axial direction, at least until a limit torque acting in a circumferential direction is reached. The at least one friction lining is arranged so as to slip on a first friction surface, which is present on only one of the drive side or output side, when the limit torque is exceeded. The at least one friction lining is (still) frictionally connected to a second friction surface which is present on the other of the drive side or output side. The at least one friction lining has, at least facing the first friction surface, a first material having a first friction coefficient, and, facing the second friction surface, a second material having a second friction coefficient which is different from the first friction coefficient.

The embodiment of the friction lining with different friction coefficients allows a predefined slipping (i.e. a twisting of the friction lining relative to the friction surface in the circumferential direction) at a (predefined) friction surface (namely always on the first friction surface), while the other (second) friction surface is still frictionally connected to the friction lining (and does not therefore slip).

In particular, the first friction coefficient is smaller than the second friction coefficient. Preferably, the first friction coefficient is at least 1% smaller, in particular at least 2% smaller, preferably at least 5% smaller, than the second friction coefficient.

The at least one friction lining may be a composite material which is formed from at least the first material and the second material. In particular, by a different distribution of materials within the friction lining, different friction coefficients may be formed so that facing the first friction surface, the friction lining has the first friction coefficient and facing the second friction surface, the second friction coefficient which is different from the first friction coefficient.

A composite material (also known as a composite or composite substance) is in particular a material which consists of two or more materials, wherein the composite material has different material properties from those of its individual materials. The materials cannot be separated from each other non-destructively.

The at least one friction lining may have at least two layers which are connected together by substance bonding (to form a so-called dual layer). A first layer forms the first friction surface and a second layer forms the second friction surface. In particular, the layers are fixedly connected together so that the layers do not shift relative to each other during operation of the torque limiter. Each layer may be formed by a composite material as described above.

The at least one friction lining forms, at least until the limit torque is reached, an exclusively frictional connection with the drive side and with the output side, at least with respect to the circumferential direction. So here there are no substance-bonded (e.g. by adhesive) or form-fit connections (e.g. by intermeshing profiling or riveting) acting in the circumferential direction.

In particular, the friction linings are arranged between the drive side and the output side or between the friction surfaces, and fixed with respect to the rotational axis by the preload of a preload spring. Thus simple assembly may be carried out.

The torque limiter may have at least a first friction lining and a second friction lining, between which the drive side or the output side is arranged.

The torque limiter is in particular configured together with a known torsion damper. The torsion damper serves for damping torque fluctuations. In particular, the torsion damper is arranged radially inside the at least one friction lining.

The at least one friction lining, the rotational axis, the drive side and output side are in particular arranged coaxially to each other.

Furthermore, a drive train for a motor vehicle is proposed, at least comprising a first drive unit (e.g. an internal combustion engine) for providing a first drive torque, and a second drive unit (e.g. an electric machine) for providing a second drive torque. The first drive unit and the second drive unit can be connected together torque-transmissively via a torque limiter or separated from each other when a limit torque is reached.

As a precaution, it is pointed out that the numerical terms used here ("first", "second" etc.) serve mainly (only) to distinguish several similar objects, sizes or processes, i.e. in particular do not necessarily specify a dependency and/or order of these objects, sizes or processes relative to each other. If a dependency and/or order is necessary, this is explicitly stated or it is evident to the person skilled in the art from studying the respective embodiment described.

BRIEF DESCRIPTION OF THE DRAWINGS

The disclosure and the technical environment are explained in more detail below with reference to the figures.

It is pointed out that the disclosure is not restricted by the exemplary embodiments shown. In particular, unless explicitly specified otherwise, it is also possible to extract partial aspects of the circumstances explained in the figures and combine these with other components and findings from the present description and/or the figures. In particular, it is pointed out that the figures, and in particular the size ratios depicted therein, are merely diagrammatic. The same reference signs designate the same objects, so that explanations from other figures may be used as supplements. In the drawings.

DETAILED DESCRIPTION

Figure 1:
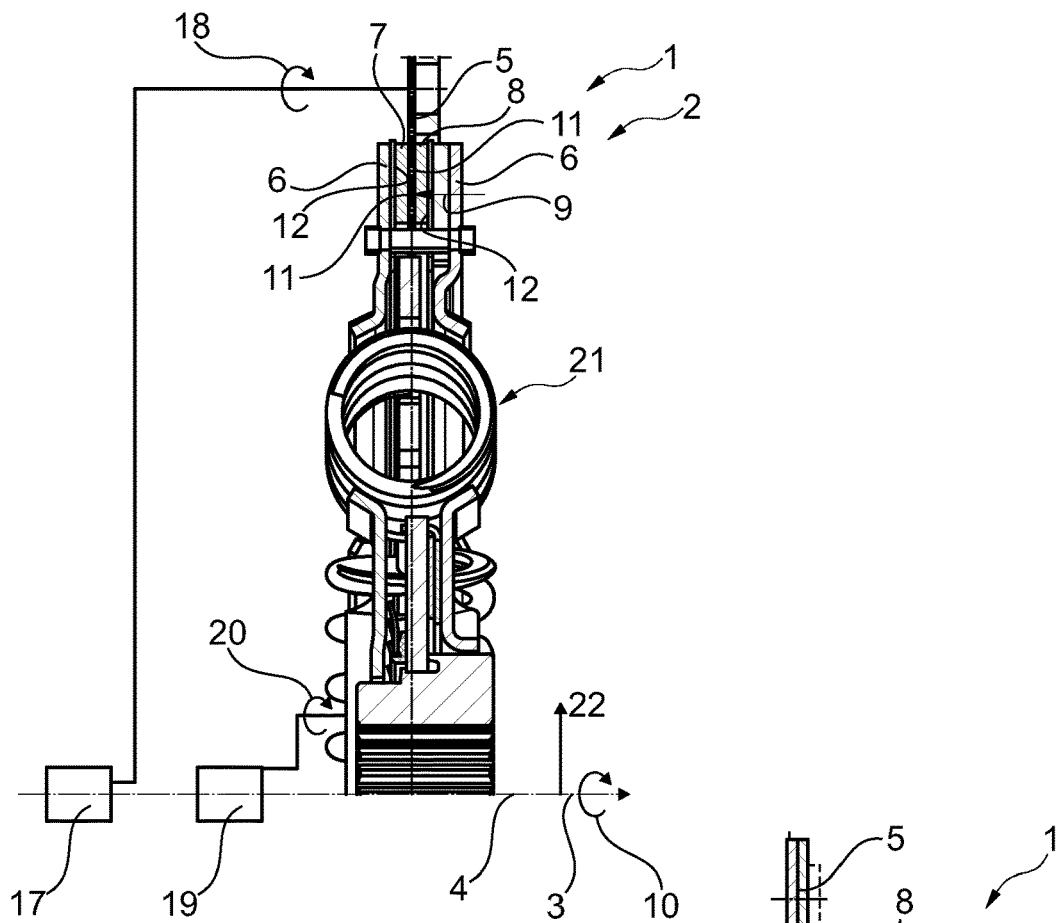
FIG. 1 shows a first embodiment variant of a torque limiter in a drive train, in side view and cross-section.

FIG. 1 shows, in a side view and in cross-section, a first embodiment variant of a torque limiter 1 in a drive train 2. The drive train 2 has a first drive unit 17 (e.g. an internal combustion engine) for providing a first drive torque 18, and a second drive unit 19 (e.g. an electric machine) for providing a second drive torque 20. The first drive torque 18 acts directly on the drive side 5 of the torque limiter 1. The second drive torque 20 acts directly on the output side 6 of the torque limiter. The output side 6 may furthermore be connected torque-transmissively to a gear mechanism (not shown here). A torsion damper 21 is arranged on the output side 6 and inside the friction linings 7, 8 in a radial direction 22. The first drive unit 17 and the second drive unit 19 may be connected together torque-transmissively via the torque limiter 1 or may be separated from each other when a limit torque has been reached.

The torque limiter 1 has a rotational axis 4 extending in an axial direction 3, and a drive side 5 and an output side 6 which can be connected together torque-transmissively via two friction linings 7, 8 and under a preload 9 acting in the axial direction 3, at least until a limit torque acting in a circumferential direction 10 has been reached. The drive side 5 is arranged between the first friction lining 7 and the second friction lining 8. The output side 6 here comprises two plates, between which the friction linings 7, 8 and the drive side 5 are arranged. A preload spring which produces the preload 9 necessary for the frictional connection is arranged between a plate on the output side 6 and a friction lining 7, 8 (here the second friction lining 8).

The friction linings 7, 8 are arranged so as to slip on a first friction surface 11, present on only one of the drive side 5 and output side 6, when the limit torque is exceeded in operation of the drive train 2, and are frictionally connected to a second friction surface 12 present on the other of the drive side 5 and output side 6.

One or both of friction linings 7, 8 may be a composite material which is formed from a first material and a second material. In particular, by a different distribution of materials within the friction lining, different friction coefficients may be formed so that facing the first friction surface, the friction lining has the first friction coefficient and facing the second friction surface, the second friction coefficient which is different from the first friction coefficient. Here, the first friction coefficient is smaller than the second friction coefficient. For example, the first friction coefficient is at least 1% smaller than the second friction coefficient. Some applications may have a first friction coefficient at least 5% smaller than the second friction coefficient.

The friction linings 7, 8, the rotational axis 3, the drive side 5 and the output side 6 are arranged coaxially to each other.

Figure 2:
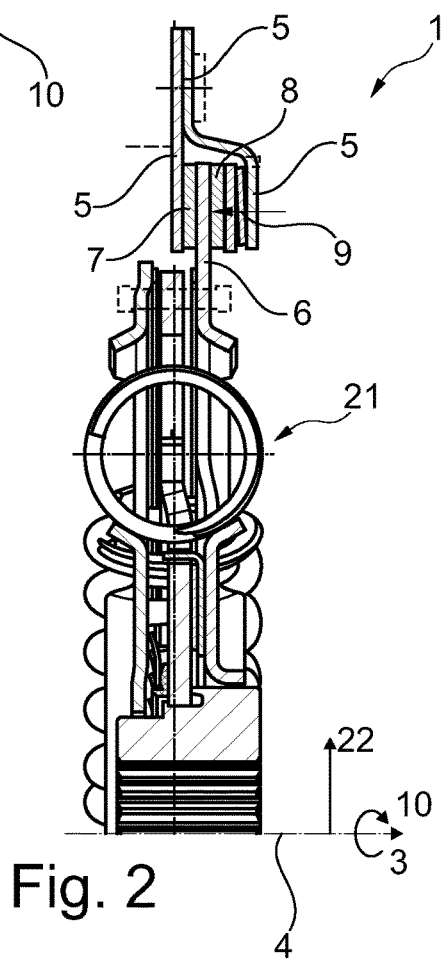
FIG. 2 shows a second embodiment of a torque limiter, in side view and cross-section.

FIG. 2 shows, in a side view and in cross-section, a second embodiment variant of a torque limiter 1. Reference is made to the statements in relation to FIG. 1. In contrast to the first embodiment variant, in the second embodiment variant, the output side 6 is arranged between the first friction lining 7 and the second friction lining 8. Here the drive side 5 comprises two plates, between which the friction linings 7, 8 and the output side 6 are arranged. A preload spring, which provides the preload 9 necessary for frictional connection, is arranged between a plate of the drive side 5 and a friction lining 7, 8 (here the second friction lining 8).

Figure 3:
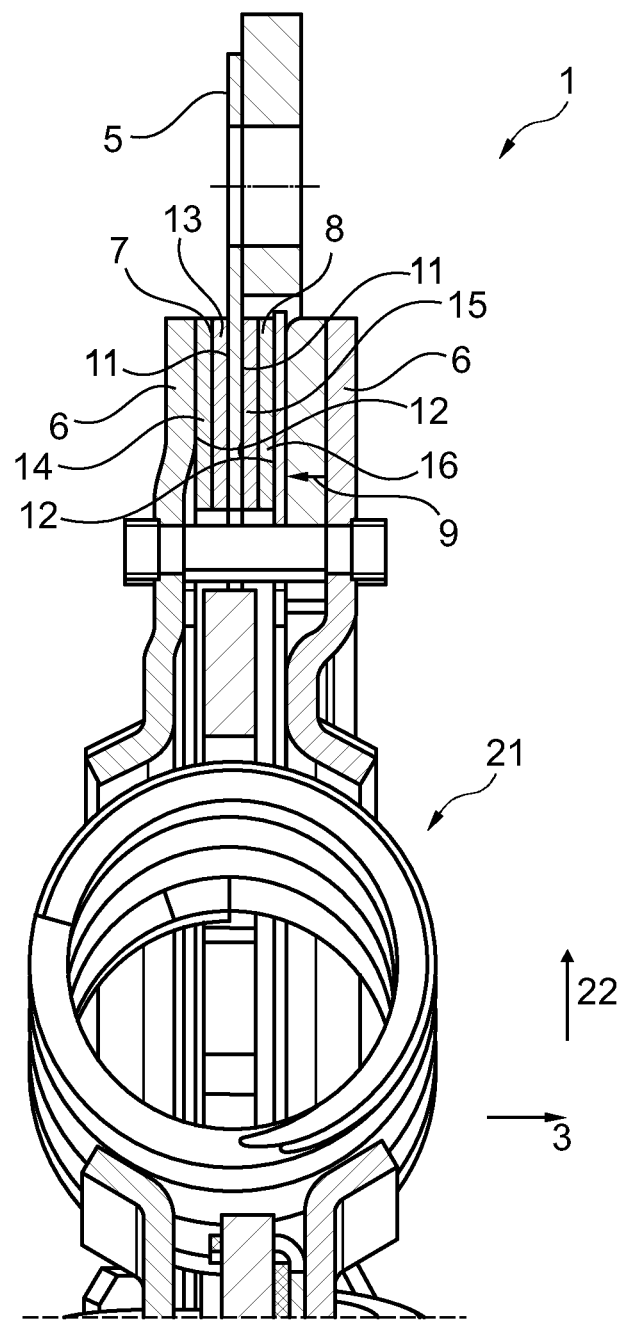
FIG. 3 shows a detail from FIG. 1.

FIG. 3 shows a detail of FIG. 1. Reference is made to the statements in relation to FIG. 1. The friction linings 7, 8 are arranged so as to slip on the first friction surface 11 (here this is arranged on the drive side 5) when the limit torque is exceeded. The friction linings 7, 8 are still frictionally connected to the second friction surface 12 (here arranged on the output side 6). For this, the friction linings 7, 8 have a first material 13 with a first friction coefficient, facing the first friction surface 11, and a second material 14 with a second friction coefficient, different from the first friction coefficient, facing the second friction surface 12.

The configuration of each friction lining 7, 8 with different friction coefficients allows the predefined slipping at a (predefined) friction surface 11 (namely always at the first friction surface 11), while the other second friction surface 12 is still frictionally connected to the respective friction lining 7, 8.

The friction linings 7, 8 are here configured as a so-called dual layer and are formed by two layers 15, 16 connected together by substance bonding. The first layer 15 forms the first friction surface 11, and the second layer 16 forms the second friction surface 12.

Each friction layer 7, 8 forms an exclusively frictional connection to the drive side 5 and the output side 6, at least with respect to the circumferential direction 10, until the limit torque is reached. So here there are no substance-bonded (e.g. by adhesive) or form-fit (e.g. by intermeshing profiling or riveting) connections acting in the circumferential direction 10.

REFERENCE NUMERALS

1 Torque limiter
2 Drive train
3 Axial direction
4 Rotational axis
5 Drive side
6 Output side
7 First friction lining
8 Second friction lining
9 Preload
10 Circumferential direction
11 First friction surface
12 Second friction surface
13 First material
14 Second material
15 First layer
16 Second layer
17 First drive unit
18 First drive torque
19 Second drive unit
20 Second drive torque
21 Torsion damper
22 Radial direction

The invention claimed is:
1. A torque limiter for a drive train, comprising:
a rotational axis extending in an axial direction;
a drive side;
an output side;
a first flat friction surface on a one of the drive side or the output side;
a second flat friction surface on the other of the drive side or the output side; and
a friction lining comprising a composite material arranged as a continuous annular ring, the composite material comprising:
  a first layer comprising a first material comprising a first friction coefficient, the first layer comprising a first layer flat surface facing the first flat friction surface; and
  a second layer connected to the first layer by substance bonding, the second layer comprising a second material comprising a second friction coefficient, different from the first friction coefficient, the second layer comprising a second layer flat surface facing the second flat friction surface, wherein the friction lining:
    is under a preload acting in the axial direction;
    torque-transmissively connects the output side to the drive side until a limit torque is reached;
    is arranged to slip on the first friction surface when the limit torque is exceeded; and
    is exclusively frictionally connected to the second friction surface without substance bonding or a form-fit connection.

2. The torque limiter of claim 1 wherein the first friction coefficient is smaller than the second friction coefficient.

3. The torque limiter of claim 2, wherein the first friction coefficient at least 1% smaller than the second friction coefficient.

4. The torque limiter of claim 1, wherein the friction lining forms an exclusively frictional connection to the drive side and to the output side until the limit torque is reached.

5. The torque limiter of claim 1, wherein:
the friction lining comprises a first friction lining and a second friction lining; and
the drive side or the output side is arranged between the first friction lining and the second friction lining.

6. A drive train for a motor vehicle, comprising:
the torque limiter of claim 1;
a first drive unit for providing a first drive torque; and
a second drive unit for providing a second drive torque, connected torque-transmissively to the first drive unit by the torque limiter.

* * * * *